Nov. 14, 1967   E. J. SELLECK   3,352,133
SAFETY HUB CAP AND LOCKING DEVICE
Filed Feb. 1, 1966
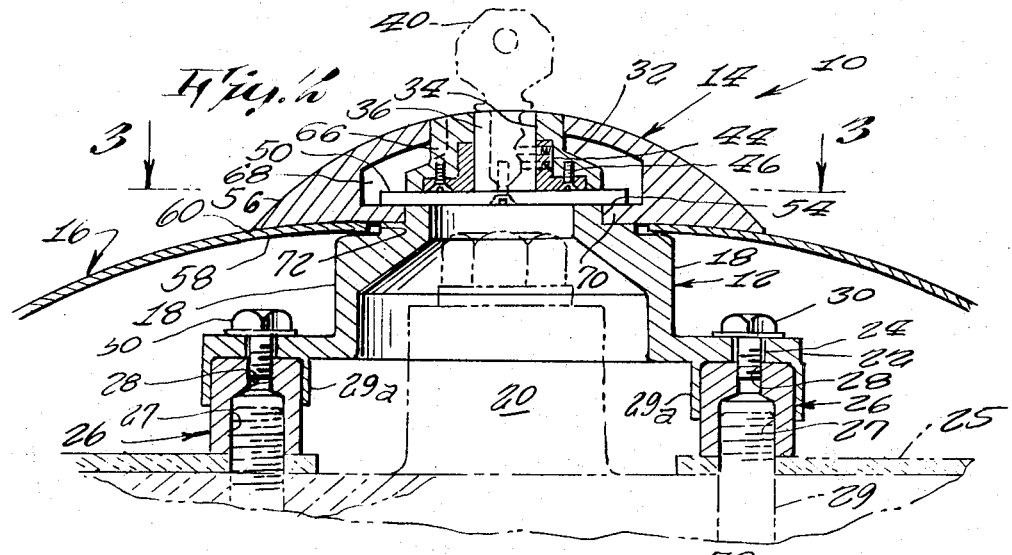
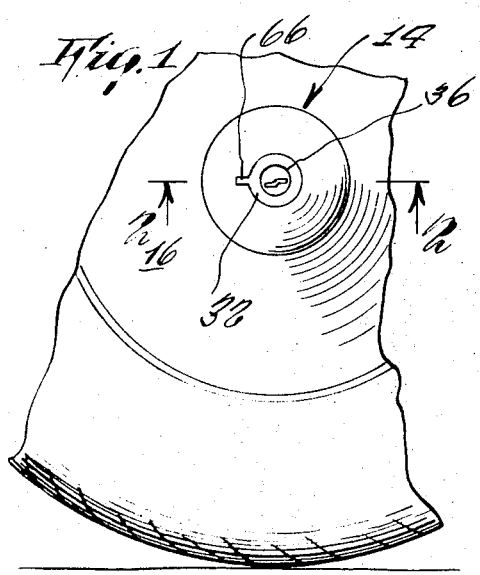
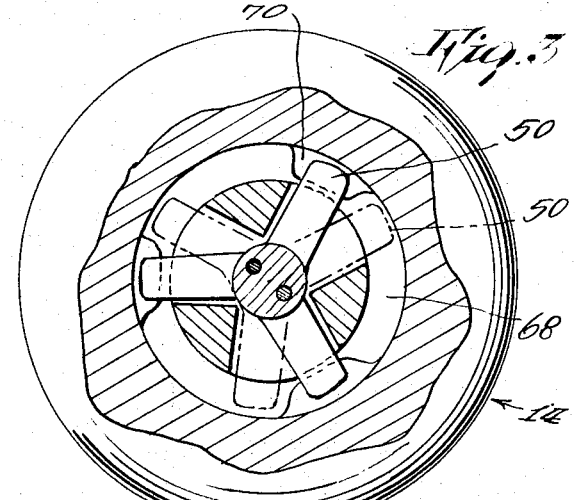
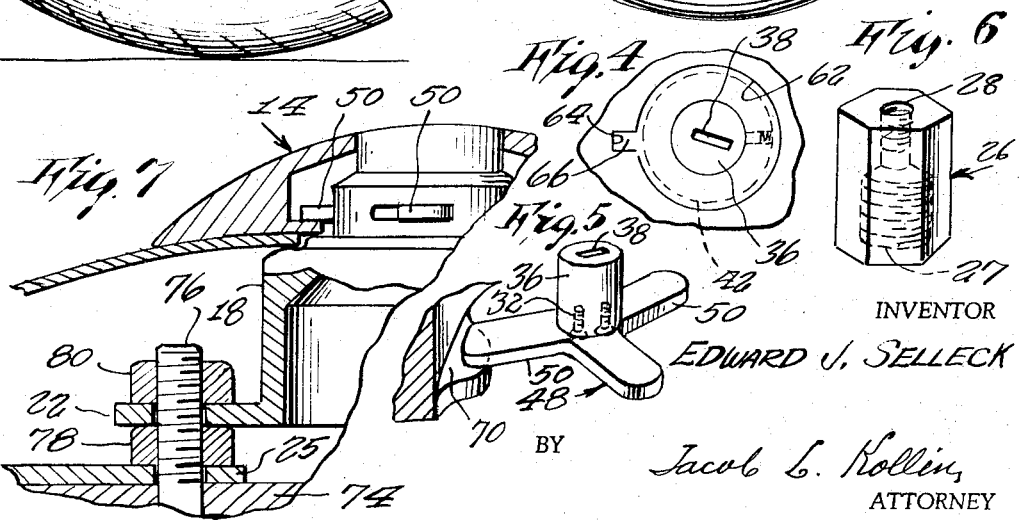
INVENTOR
EDWARD J. SELLECK
BY
Jacob L. Rollin,
ATTORNEY

United States Patent Office 3,352,133
Patented Nov. 14, 1967

3,352,133
SAFETY HUB CAP AND LOCKING DEVICE
Edward J. Selleck, 955 82nd St.,
Brooklyn, N.Y. 11228
Filed Feb. 1, 1966, Ser. No. 524,346
1 Claim. (Cl. 70—259)

ABSTRACT OF THE DISCLOSURE

A hub cap and wheel locking device having a sleeve positioned over a wheel hub and secured to the wheel. A removable hollow cover fits over the other end of the sleeve and overlaps the hub cap. The cover has inwardly projecting lugs. A rotatable bolt in the sleeve has laterally extending arms releasably engageable with the lugs to prevent the removal of the cover and the hub cap. A tumbler lock in the sleeve locks the bolt when the arms are in engagement with the lugs. Wheel bolts of sufficient length to receive a pair of nuts and the laterally extending arms between the nuts are provided. One of the nuts secures the wheel to the wheel drum and the other of the pair of nuts secures the lugs to the bolt. Retainer caps are provided to fit over the special nuts.

---

This invention relates generally to automatic accessories. More specifically it relates to hub cap and wheel locking devices.

The present invention is an improvement of the previous invention described and claimed in the co-pending application Ser. No. 472,507, filed July 16, 1965 by the same applicant.

The improvement comprises safety features in the locking device whereby an accidental loosening of the wheel disk to which the wheel locking device is attached is averted, as is the loosening of the locking device itself.

It is generally well known to those skilled in the art that theft of hub caps and wheels are commonplace occurrences. Such thefts can be expensive in view of the costs of these automotive parts, as well as of the tires mounted upon the wheels. In some such thefts, after removal of the wheel, the axle is allowed to drop down on the street, particularly when the thief is anxious to get away fast, such fall possibly bending or otherwise damaging the axle hub. Besides these costs there is the inconvenience of remounting another wheel before the car can be used again. Accordingly, this condition is undesirable and in want of improvement.

Accordingly, it is an object of the present invention to provide a locking device having self-contained means to lock the hup cap upon the wheel for preventing removal of the hub cap and thus prevent gaining access to the wheel bolts for removal of the wheel.

An important object of the invention is to provide safety means which will prevent a loosening of the wheel disks to which the hub cap and wheel locking device is secured, as well as the device itself, thus preventing accidents.

Another object is to provide a locking device wherein the safety means comprise retainer caps secured to said locking device, said caps preventing the wheel disk securing nuts from loosening.

Another object is to provide a locking device wherein the above automotive parts can all be retained by such device consisting of a single locking unit.

Another object is to provide a locking device that is adaptable to be commercially sold together with automotive hub caps, in view of the association of these parts, to fit one another, thereby promoting the sale of new hub caps.

Another object is to provide a locking device adaptable for use on old hub caps (if so preferred) and wherein the old hub cap requires only that an opening of proper size be drilled out at the center thereof.

Still another object is to provide a locking device having a pleasing streamlined outer appearance that will add to the attractiveness of the car.

A still further object is to provide a locking device providing an additional cover over the wheel bolts to further prevent in line access thereto even if the hub cap were forcibly bent.

Other objects are to provide a locking device that is simple in design, inexpensive to manufacture, rugged in construction, easy to install and remove and efficient in operation.

These and other objects will be readily apparent upon a study of the following specification and the accompanying drawing wherein:

FIG. 1 is a fragmentary outer side view of an automotive wheel assembly showing the invention incorporated therewith;

FIG. 2 is an enlarged detailed cross-sectional view taken on line 2—2 of FIGURE 1;

FIG. 3 is a cross-sectional view taken on line 3—3 of FIG. 2;

FIG. 4 is a face view of the lock in unlocked position;

FIG. 5 is a perspective view of a position of the locking device;

FIG. 6 is a perspective view of the extension device used in the invention; and

FIG. 7 is a partial view of the device, partly in section illustrating a variation of the safety securing means.

Referring now to the drawing in detail, the numeral 10 represents a hub cap and wheel locking device according to the present invention wherein there is a spider or sleeve 12 and hub cap cover 14 which fits over a hub cap 16.

The spider 12 has a cylindrical sleeve 18, which fits over an axle hub 20 of an automobile. At one end of the sleeve there is a radially outward extending flange 22 having openings 24.

The openings 24 provide means for mounting the spider stationarily relative to the wheel 25. A special extension nut 26 having threads 27 and 28 at its opposite ends is secured by the thread 27 to the conventional wheel bolts 29 of wheel 25, while the other thread 28 is adapted to receive a bolt 30 passed through opening 24 in the spider. Bolts 30 may be of the same thickness as the wheel bolts 29, in which case the threads in the extension nuts and said openings in the spider may be of corresponding size.

Additionally, if desired, there may be secured to the flange 22 retainer caps 29a conforming in shape to the nuts 26 and adapted to fit over these nuts. The caps are spaced like the nuts and align with the latter. Thus, when the flange 22 is secured by bolts 30 to the special extension nuts 26, these nuts are prevented from turning and loosening. At the opposite end of the sleeve there is a generally conically tapered end 32 having a central opening 34 therethrough, within which a lock barrel 36 is mounted.

An end opening 38 in the barrel provides access for a key 40 for sliding springloaded tumblers 42 in a manner well known in locks for locking and unlocking the barrel from a lock sleeve 44 into which the tumblers slide. The lock sleeve is secured by screws 46 to end 32. A rotatable bolt 48 having radial arms 50 is secured by screws 52 to the end of the barrel thereby providing rotation of the arms when the barrel is turned by the key and also preventing removal of the barrel out of the end 32.

The arms 50 extend out of slots 54 in the sides of the end 32.

The hub cap cover 14 is of generally hemispherical configuration, having a convex outer wall 56 for streamlined appearance, a flat or concave rear wall 58 to fit over the outer face of the hub cap and a circular peripheral edge 60. The hub cap cover has a central opening 62 through which the terminal portion of end 32 is slidably received. A keyway 64 in opening 62 receives a key 66 formed on the end 32 for preventing rotation of the hub cap cover relative to the spider. The opening 62 communicates with a central chamber 68 within the cover 14. A plurality of radially inward extending lugs 70 protrudes into the chamber and provides engagement means with arms 50 for locking the cover on the spider.

The hub cap 16 has a central opening 72 to permit movement of the hub cap over the arms 50 when it is desired to gain access to the wheel bolts 26.

In operative use, when it is necessary to remove the wheel (such as when a flat tire has occurred) the motorist simply inserts a key in the lock and turns the barrel, thus moving arms 50 out of engagement with the lugs 70 and permitting removal of the cover 14 and hub cap 16.

Thus access is provided to unscrew nuts 30 and remove the spider 12 off the special nuts 26.

The motorist may now remove the special nuts 26 thereby permitting removal of wheel 25. After a new wheel assembly is installed the process is repeated in reverse thus securely locking the assembly against any unauthorized access thereto.

In a modified construction shown in FIGURE 7, the spider 12 is differently mounted to the wheel than described above. FIGURE 7 shows the wheel drum 74 having wheel bolts 76 of sufficiently long length to accommodate a pair of nuts 78 and 80 as well as the flange 22. In this construction the wheel 25 is secured to the wheel drum 82 by means of the nut 78. Then the spider is separately secured by the nut 80.

Having thus set forth my invention, what I claim as new and desire to secure by Letters Patent of the United States is:

In a hub cap and wheel locking device, the combination of a spider member, a hub cap and a hub cap cover member provided with lugs, said hub cap cover member being removably secured on one end of said spider member, said hub cap being received between said spider and hub cap cover members and said spider having means for securement of the wheel bolts of an automotive vehicle, said spider member comprising a cylindrical sleeve, a radially outwardly extending flange at one end of said sleeve, openings in said flange providing mounting means to an automobile wheel, a conically tapered end at the opposite end of said sleeve, a central opening in said end, a rotatable lock barrel within a fixed lock sleeve within said central opening, a rotatable bolt having radially outward extending arms secured to one end of said lock barrel, the ends of said arms extending out of slots in the sides of said end at one end of said sleeve and engaging with the lug means on said cover member and means on said spider to prevent rotation of said hub cap cover member relative to said spider member, said securement means comprising a plurality of special nuts, one of each said nuts being associated with each of said flange openings, each said nut having an internal thread at each opposite end, one of said threads being threadingly engageable with the wheel bolt of an automotive vehicle and the other thread receiving a bolt passed through said flange opening, said flange being provided with retainer caps adapted to fit over said special nuts, said retainer caps being positioned for alignment with said nuts.

References Cited

UNITED STATES PATENTS

| 2,493,366 | 1/1950 | Simcich | 301—108 |
| 2,798,770 | 7/1957 | Terrick | 301—9 |
| 2,851,309 | 9/1958 | Lyon | 301—37 |
| 2,869,929 | 1/1959 | Hurd | 301—37 |
| 3,170,733 | 2/1965 | Lamme | 301—37 |

FOREIGN PATENTS

| 660,155 | 3/1963 | Canada. |
| 1,021,957 | 10/1952 | France. |

RICHARD J. JOHNSON, *Primary Examiner.*